United States Patent [19]
Bobb

[11] Patent Number: 5,349,437
[45] Date of Patent: Sep. 20, 1994

[54] ELECTROMAGNETIC RADIATION DETECTOR UTILIZING AN ELECTROMAGNETIC RADIATION ABSORBING ELEMENT IN A MACH-ZEHNDER INTERFEROMETER ARRANGEMENT

[75] Inventor: Lloyd C. Bobb, Horsham, Pa.

[73] Assignee: The United States of America as represented by the Secretary of the Navy, Washington, D.C.

[21] Appl. No.: 954,521

[22] Filed: Sep. 30, 1992

[51] Int. Cl.$^5$ ................................. G01B 9/02
[52] U.S. Cl. ....................... 356/345; 250/227.27
[58] Field of Search ............... 356/345; 250/227.19, 250/227.27; 385/12, 14

[56] References Cited

U.S. PATENT DOCUMENTS 4,187,026  2/1980  Schaffer et al. .............. 356/213
4,271,358  6/1981  Schwarz .
4,481,418 11/1984  Vanzetti et al. .
4,485,305 11/1984  Kuwano et al. .
4,714,342 11/1987  Jackson et al. .
4,755,668  7/1988  Davis .
4,759,627  7/1988  Thylen et al. ................... 356/345

Primary Examiner—Samuel A. Turner
Assistant Examiner—Robert Kim
Attorney, Agent, or Firm—James V. Tura; James B. Bechtel; Susan E. Verona

[57] ABSTRACT

Apparatus is provided to detect electromagnetic radiation, in which a radiation-absorbing element is disposed on a short section of an optical waveguide to provide a thermal interface therebetween. Radiation is absorbed by the element, which thereby heats the waveguide, causing it to change its optical pathlength in proportion to the radiation absorbed. Interferometer apparatus is connected to measure this change in optical pathlength as a change in the interference condition. This device is highly sensitive and can be operated at room temperature.

11 Claims, 1 Drawing Sheet 6,349,437

ELECTROMAGNETIC RADIATION DETECTOR UTILIZING AN ELECTROMAGNETIC RADIATION ABSORBING ELEMENT IN A MACH-ZEHNDER INTERFEROMETER ARRANGEMENT

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to an electromagnetic radiation detector, and more particularly to a highly sensitive optical fiber infrared radiation detector.

Devices for detecting electromagnetic radiation have a variety of applications. Infrared detectors in particular have applications in surveillance, weather forecasting and medical diagnostics. Many excellent detectors exist for the ultraviolet-to-near-infrared portion of the electromagnetic spectrum, including photomultiplier tubes and silicon and gallium arsenide detectors. Longer wavelength radiation, such as infrared, is more difficult to detect with a high degree of sensitivity because it is more easily lost in the noise caused by local temperature fluctuations. The more sensitive devices currently available are photon detectors which employ semiconductor materials like gold-doped germanium and mercury cadmium telluride. These materials are quite expensive and require operation at liquid nitrogen temperature (around 77° K.), which presents additional cost and complexity. Also, these devices are too large because of the associated cooling apparatus to be used for some applications, such as incorporation into a missile. These devices are also not capable of operating over a broad wavelength range, which is desirable for some applications. Pyroelectric or thermistor devices are currently available for use at room temperature, but these devices are one to two orders of magnitude less sensitive than photon detectors. Also, these devices may not be rugged enough to be used in hostile environments, such as caustic or high-electric-potential environments. Currently, no highly sensitive infrared detector exists which will operate at room temperature.

Optical waveguides or fibers are currently used in interferometers to sense physical parameters by directing light through an optical fiber which is adapted to be altered by the physical parameter, and measuring the change in the phase of the light caused by the physical parameter by measuring the interference pattern created by combining the phase-changed light with light from a reference optical fiber. Examples of such interferometers include Mach-Zehnder and Michelson interferometers. In many of these arrangements, the physical parameter in some way varies the fiber's length and/or refractive index and hence its optical pathlength. This change in optical path length shifts the phase of the light beam passing through the fiber, which shift can be measured by measuring the resulting change in the interferometer's interference pattern. No such device exists to detect infrared radiation.

SUMMARY OF THE INVENTION

It is therefore a general object of the present invention to provide highly sensitive apparatus for detecting electromagnetic radiation.

It is a more specific object to provide apparatus which can detect infrared radiation accurately at room temperature.

It is another object to provide a radiation detector which can be used in a hostile environment.

It is yet another object to provide a radiation detector which is small in size.

Briefly, these and other objects are accomplished by apparatus for detecting electromagnetic radiation, comprising a single-mode optical waveguide and an electromagnetic radiation-absorbing element disposed at a thermal interface with the waveguide along a longitudinal portion of the length thereof to apply heat thereto in proportion to the magnitude of radiation impinged upon and absorbed by the element. Interferometer apparatus is operatively connected to the waveguide to measure a change in the optical pathlength thereof in proportion to the heat applied thereto, which change in optical pathlength is indicative of the amount of electromagnetic radiation absorbed.

Other objects, advantages, and novel features of the invention will become apparent from the following detailed description of the invention when considered in conjunction with the accompanying drawing.

DESCRIPTION OF THE PREFERRED EMBODIMENT

Figure 1:
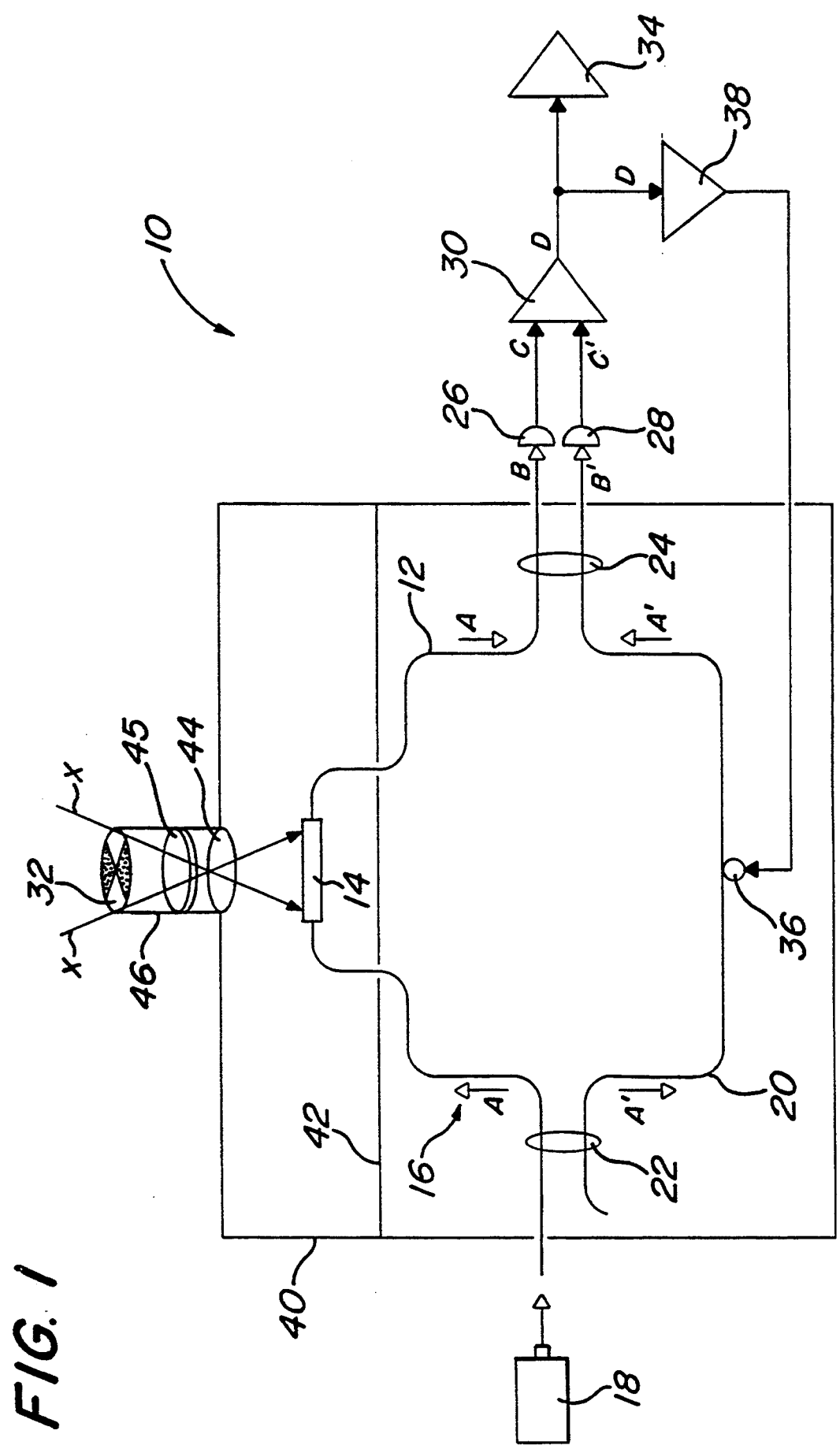
FIG. 1 is a schematic illustration of the electromagnetic radiation detector of the present invention.

FIG. 1 schematically illustrates one embodiment of the optical fiber electromagnetic radiation detector 10 of the present invention. Optical waveguide 12, having an electromagnetic radiation-absorbing element 14 disposed thereon, is part of an interferometer 16. Optical waveguide 12 is a single-mode optical fiber for propagating coherent light therethrough, and has a protective jacket disposed therearound. Electromagnetic radiation-absorbing element 14 is disposed on waveguide 12 such that there is a thermal interface therebetween. In this way, heat generated by element 14 when it absorbs incoming radiation X is transferred to waveguide 12, changing its length and/or its refractive index. The jacket is preferably removed from the portion of waveguide 12 which has element 14 disposed thereon to maximize heat transfer. Waveguide 12 can also be etched beneath element 14 to reduce its cross-sectional area. This reduces the thermal mass of waveguide 12, making it more responsive to temperature change. Radiation-absorbing element 14 may be any material which is capable of thermally interfacing with waveguide 12 and of absorbing a desired preselected wavelength band of radiation, for instance, infrared radiation. The use of a material with a high thermal expansion coefficient may increase the sensitivity by forcing waveguide 12 to change length more, but thermal mass will increase as well. Radiation-absorbing element 14 should preferably be thin, to minimize the thermal mass thereof and shorten the thermal response time of detector 10. However, since absorption is proportional to thickness, element 14 should be thick enough to absorb, rather than transmit, radiation X. Coatings of the desired thickness are achievable using vacuum deposition or chemical vapor deposition. The length of radiation-absorbing element 14 may vary and will depend upon the needs of the application. The longer element 14 is, the more sensitive detector 10 will be. The amount of the circumference of waveguide 12 which is covered by element 14 may vary from application to application as well. One convenient embodiment is to dispose element 14 around the entire circumference of a segment of waveguide 12. A 1-cm length of 10-micron-thick carbon disposed around the entire circumference of waveguide would make a suitable element 14 for detecting infrared radiation. Anodized aluminum and other oxidized metals will work well also. Element 14 may also be diffused into the outer circumference of waveguide 12 (not as deep as into the core), in which case the element may be any material which meets the above-stated requirements and which is capable of being diffused into glass.

When element 14 absorbs radiation X it heats up proportionally. The heat is transferred to waveguide 12, changing its length and/or refractive index proportionally. This change in waveguide 12 causes a change in its optical pathlength when light of a given wavelength is propagated therethrough, which in turn effects a change in the phase of the light propagating therethrough. This phase change is measured using interferometer 16, which may be of the standard Mach-Zehnder type known to those skilled in the optical arts. Substantially identical coherent, narrow-band light beams from a coherent light source 18, such as a laser, are launched into the cores of two parallel single-mode optical waveguides 12 (having element 14 disposed thereon) and 20, which form the two arms of the interferometer. Coherent light source 18 is coupled through a beam splitter 22 such as an optical fiber coupler, to launch substantially identical light beams A and A' through the cores of optical waveguides 12 and 20. The light beams A and A' from waveguides 12 and 20 are combined to interfere at a combiner 24, such as an optical fiber coupler. The combined light then exits combiner 24 as two beams B and B' to be collected by photodiodes 26 and 28 which convert the light beams B and B' to electrical signals C and C' which are proportional to the intensities of beams B and B'. A differential amplifier 30 receives and compares electrical signals C and C' from photodiodes 26 and 28 and produces an electrical signal D which is proportional to the difference in intensities of beams B and B' which in turn are indicative of the relative phase of beams A and A' through waveguides 12 and 20. Signal D therefore indicates any phase shift which has occurred between the light beams through waveguides 12 and 20, including that which results from electromagnetic radiation X being absorbed by element 14. To filter out phase shift occurring due to ambient fluctuations, incoming radiation X should be chopped. Signal chopping means 32 is positioned to receive radiation X before it impinges on element 14, and may be, for instance, two stacked circular reticles having alternating opaque and transparent spokes. One reticle is fixed and the other one rotates, so that radiation is alternately blocked and transmitted at a known frequency. Signal D from differential amplifier 30 is sent to a lock-in amplifier 34 for amplifying only those signals at the chopped frequency. Electrical signal D may also be applied as a feedback signal to a PZT fiber stretcher 36 by way of a locking amplifier 38, for maintaining quadrature for maximum sensitivity. The locking frequency should be lower than the frequency of the chopped incoming radiation X. Other means for maintaining quadrature may also be used, such as thermal phase modulation by optical or electrical means. Of course, interferometer 16 should be calibrated so that signal D correlates with a known amount of radiation absorbed.

Standard means for packaging or enclosing waveguides 12 and 20, represented schematically by housing 40, should include means, such as a baffle plate 42, for isolating all but element 14 from exposure to radiation X.

A focussing means such as a lens 44 is mounted in housing 40 for collecting radiation X and focussing it onto element 14. Lens 44 is selected to permit transmission of radiation of only the desired wavelength, such as infrared radiation. Alternatively, a filter 45 may be placed adjacent to lens 44 for filtering out all but the desired wavelength of radiation before collecting and focussing it. A means, such as an extension tube 46 for limiting the field of view of element 14, enables better discrimination amongst multiple sources of radiation.

Some of the many advantages of the invention should now be readily apparent. For instance, a highly sensitive room-temperature apparatus for detecting electromagnetic radiation, in particular infrared radiation, is provided. Energies as small as $2 \times 10^{-10}$ joules are detectable using a standard silica fiber. Furthermore, the apparatus can be used in caustic and high-electric-potential environments, and can be made to be quite small.

Those skilled in the art will appreciate that many modifications and variations are possible to the above-disclosed optical fiber electromagnetic radiation detector. For instance, other interferometer arrangements can be used, such as the Michelson, the loop, and the Fabry-Perot. Consequently, it should be understood that all such modifications and variations fall within the scope of the following claims.

What I claim is:

1. Apparatus for detecting electromagnetic radiation, comprising:
   a single-mode optical waveguide;
   an electromagnetic radiation-absorbing element disposed at a thermal interface with said waveguide along a longitudinal portion of the length thereof to apply heat thereto in proportion to the magnitude of electromagnetic radiation impinged upon and absorbed by said electromagnetic radiation-absorbing element;
   means for chopping the electromagnetic radiation impinged upon said electromagnetic radiation-absorbing element; and
   interferometer apparatus operatively connected to said waveguide to measure a change in the optical pathlength thereof in proportion to the heat applied thereto, which change in optical pathlength is indicative of the amount of electromagnetic radiation absorbed.

2. The apparatus of claim 1, further comprising means for shielding the length of said waveguide not having said electromagnetic radiation-absorbing element disposed thereon.

3. The apparatus of claim 1 wherein the thickness of said electromagnetic radiation-absorbing element is determined in accordance with the desired sensitivity of the apparatus.

4. The apparatus of claim 1 wherein said electromagnetic radiation-absorbing element circumferentially encloses a longitudinal segment of said waveguide.

5. The apparatus of claim 1, further comprising:
  means for collecting the electromagnetic radiation and focussing it onto said electromagnetic radiation-absorbing element; and
  means adjacent to said electromagnetic radiation-absorbing element for filtering unwanted preselected wavelengths of electromagnetic radiation from impinging upon said electromagnetic radiation-absorbing element.

6. The apparatus of claim 5, wherein said electromagnetic radiation-absorbing element is carbon.

7. Apparatus for detecting electromagnetic radiation, comprising:
  a single-mode optical waveguide;
  an electromagnetic radiation-absorbing element disposed at a thermal interface with said waveguide along a longitudinal portion of the length thereof to apply heat thereto in proportion to the magnitude of electromagnetic radiation impinged upon and absorbed by said electromagnetic radiation-absorbing element;
  means for collecting the electromagnetic radiation and focussing it onto said electromagnetic radiation-absorbing element; and
  interferometer apparatus operatively connected to said waveguide to measure a change in the optical pathlength thereof in proportion to the heat applied thereto, which change in optical pathlength is indicative of the amount of electromagnetic radiation absorbed.

8. The apparatus of claim 7, wherein said collecting and focussing means is a lens positioned adjacent to said electromagnetic radiation-absorbing element.

9. The apparatus of claim 7, wherein said single-mode optical waveguide is etched along the longitudinal portion of the length thereof having said electromagnetic radiation-absorbing element disposed thereon.

10. Apparatus for detecting electromagnetic radiation, comprising:
  a single-mode optical waveguide;
  an electromagnetic radiation-absorbing element disposed at a thermal interface with said waveguide along a longitudinal portion of the length thereof to apply heat thereto in proportion to the magnitude of electromagnetic radiation impinged upon and absorbed by said electromagnetic radiation-absorbing element;
  a means adjacent to said electromagnetic radiation-absorbing element for filtering unwanted preselected wavelengths of electromagnetic radiation from impinging upon said electromagnetic radiation-absorbing element; and
  interferometer apparatus operatively connected to said waveguide to measure a change in the optical pathlength thereof in proportion to the heat applied thereto, which change in optical pathlength is indicative of the amount of electromagnetic radiation absorbed.

11. Apparatus for detecting electromagnetic radiation, comprising:
  a single-mode optical waveguide;
  a carbon element disposed at a thermal interface with said waveguide along a longitudinal portion of the length thereof to apply heat thereto in proportion to the magnitude of electromagnetic radiation impinged upon and absorbed by said carbon element; and
  interferometer apparatus operatively connected to said waveguide to measure a change in the optical pathlength thereof in proportion to the heat applied thereto, which change in optical pathlength is indicative of the amount of electromagnetic radiation absorbed.

* * * * *